United States Patent [19]

Suzuki et al.

[11] 3,996,433
[45] Dec. 7, 1976

[54] LEVER SWITCH STRUCTURE

[75] Inventors: Masaru Suzuki, Chiryu; Atushi Takemura, Aichi, both of Japan

[73] Assignee: Kabushiki Kaisha Tokai Rika Denki Seisakusho, Japan

[22] Filed: Oct. 15, 1974

[21] Appl. No.: 514,823

[30] Foreign Application Priority Data

Apr. 4, 1974 Japan .............................. 49-38890

[52] U.S. Cl. .......................... 200/61.27; 200/61.54; 200/159 R
[51] Int. Cl.² ...................... H01H 3/16; H01H 9/00; H01H 13/64
[58] Field of Search ........... 200/61.27, 61.28, 61.3, 200/61.34, 61.35, 61.54, 61.57, 61.85, 61.88, 4, 159 R, 250

[56] References Cited

UNITED STATES PATENTS

| 3,499,125 | 3/1970 | Stoi | 200/61.54 X |
|---|---|---|---|
| 3,511,943 | 5/1970 | Kibler | 200/61.27 X |
| 3,576,530 | 4/1971 | Buechler et al. | 200/61.54 X |
| 3,671,691 | 6/1972 | Suzuki et al. | 200/61.54 |
| 3,761,662 | 9/1973 | Charles | 200/61.54 |
| 3,859,489 | 1/1975 | Tomlinson | 200/61.27 X |

FOREIGN PATENTS OR APPLICATIONS

| 1,556,288 | 12/1968 | France | 200/61.27 |
|---|---|---|---|
| 1,031,759 | 6/1966 | United Kingdom | 200/61.34 |
| 865,538 | 4/1961 | United Kingdom | 200/61.28 |

*Primary Examiner*—James R. Scott
*Attorney, Agent, or Firm*—Woodhams, Blanchard and Flynn

[57] ABSTRACT

In a lever switch structure for use in a motor vehicle which comprises a lever having at one end portion a knob switch assembly and at the other end a switch assembly of a direction indicator, the knob switch assembly including a lower knob body mounted slidably and rotatably on the lever, an upper knob body adapted to be screwed with the lower knob body to form a complete knob body assembly, a fixed contact formed at the top end of the lever, a movable contact provided in an upper portion of the knob switch assembly and positioned to face the fixed contact, the improvement comprising a rotation stopper means.

4 Claims, 21 Drawing Figures

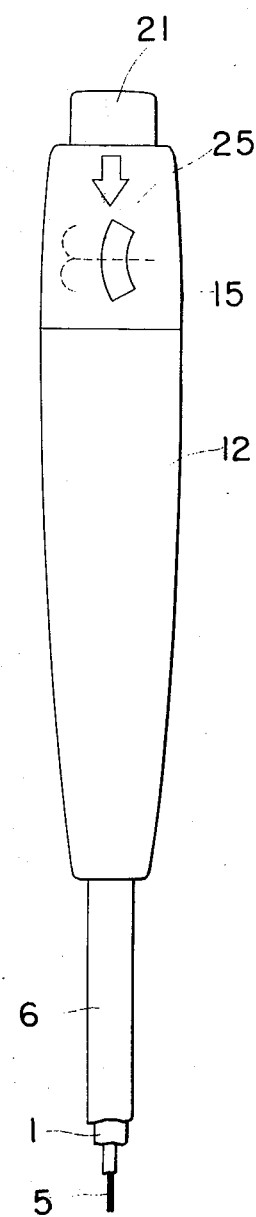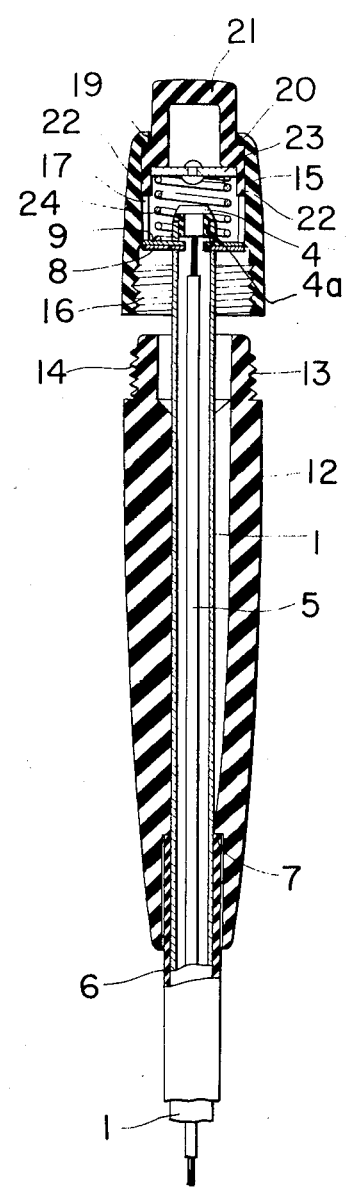

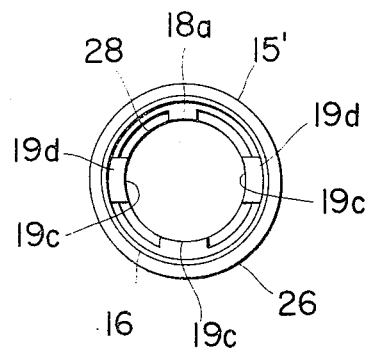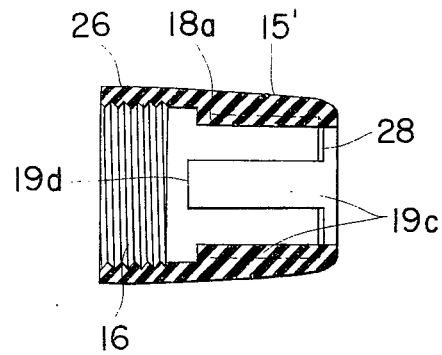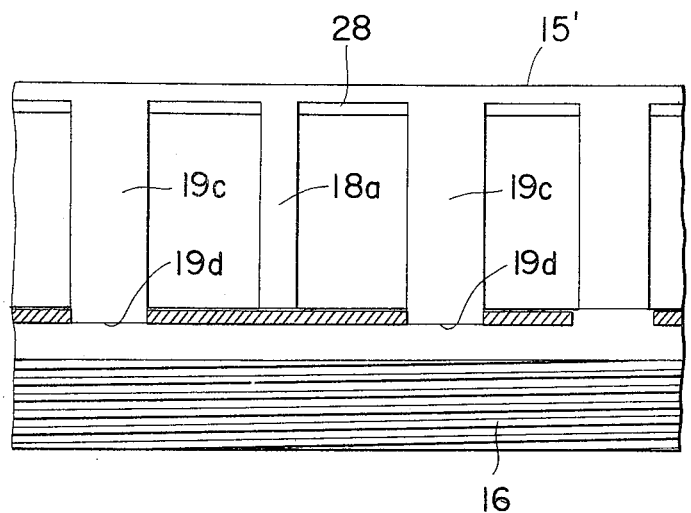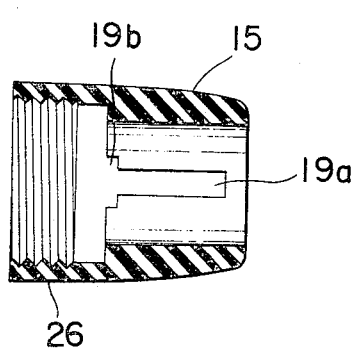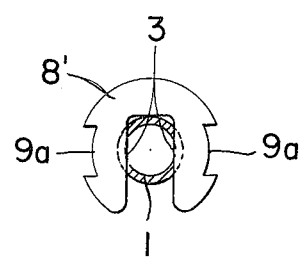

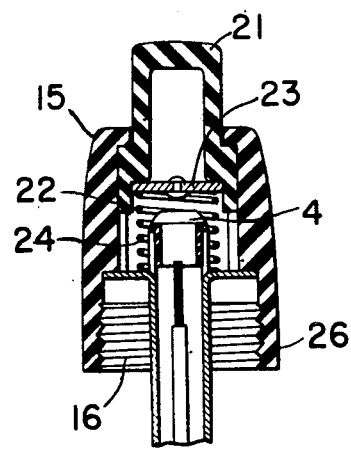
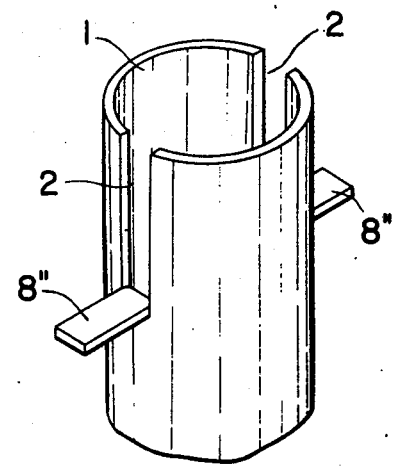
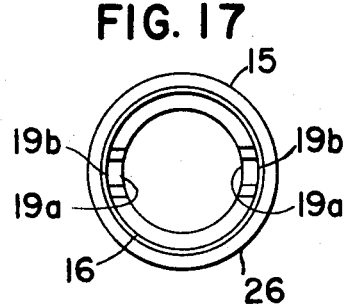
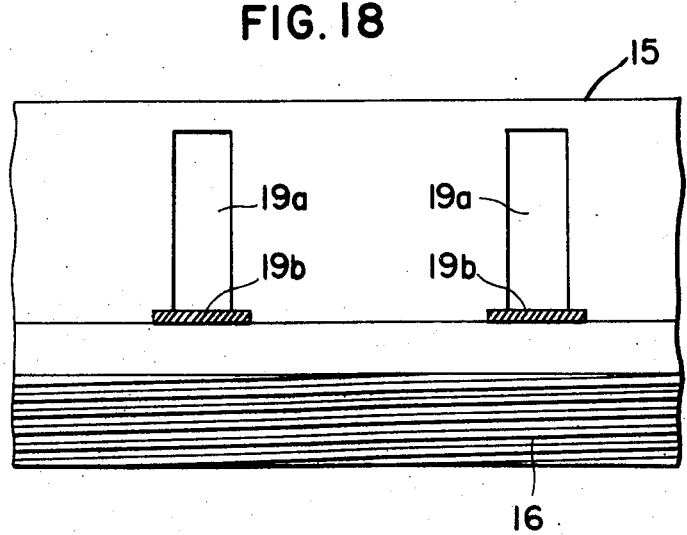

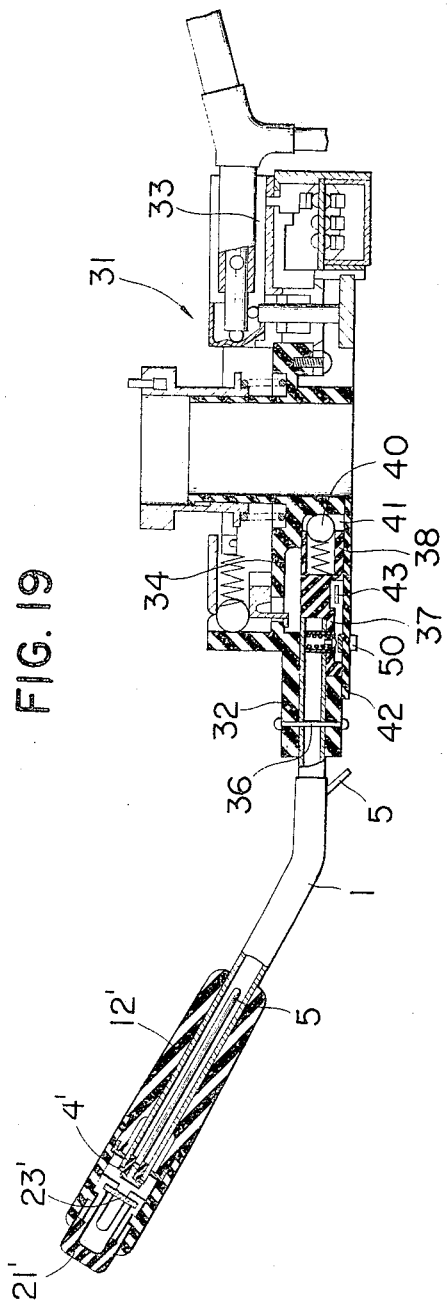

LEVER SWITCH STRUCTURE

This invention relates to a lever switch structure for use in a motor vehicle, and more particularly to a lever switch structure which includes a novel knob switch assembly.

In a conventional lever switch structure, the knob switch assembly which is provided at one end portion of the lever comprises an upper knob body and a lower knob body. The upper and lower knob bodies are arranged so that they are screwed together to form one complete knob body. The complete knob body is provided on its external periphery with some type of mark such as an ornamental design and/or letter. The mark should be located in the most suitable angular position on the complete knob body to show the type of load to be controlled thereby and/or the direction of switching to the operator of the lever. However, to assemble the knob body, a particular adjusting step is always required to locate the mark in the most suitable angular position.

The present invention has been made taking into consideration the above mentioned requirement.

It is therefore an object of the present invention to provide a lever switch structure including a knob switch assembly provided with a mark on the external periphery of the complete knob switch assembly, in which the mark can be automatically aligned to a predetermined angular position in assembling the knob switch assembly.

It is another object of the present invention to provide a lever switch structure including a lever of conductive material which serves as one of the conductors of a circuit in the lever switch structure to simplify the wiring which passes through the hollow portion of the lever.

According to the invention, there is provided a lever switch structure for use in a motor vehicle comprising a lever having at one end portion a knob switch assembly and at the other end a switch assembly of a direction indicator, the knob switch assembly including a lower knob body mounted slidably and rotatably on the lever, an upper knob body adatped to be screwed with the lower knob body to form a complete knob body assembly, a fixed contact formed at the tip end of the lever, a movable contact provided in an upper portion of the knob switch assembly and positioned to face the fixed contact, the improvement comprising a rotation stopper means provided at one end portion of the lever and having an engage portion to engage with a groove portion provided on the internal periphery of the upper knob body.

The present invention will be better understood from the following description taken in connection with the accompanying drawings in which:

FIG. 1 is a plan view of one form of a knob switch assembly according to the present invention;

FIG. 2 is an axial sectional view of the knob switch assembly shown in FIG. 1;

FIG. 10 is a sectional view of an upper knob body of the knob switch assembly of FIG. 9;

FIG. 11 is an end view of the upper knob body shown in FIG. 10;

FIG. 12 is a development of the upper knob body shown in FIG. 10;

FIG. 13 is a plan view of a stopper member used in the upper knob body shown in FIG. 10;

FIG. 14 is a sectional view of an upper knob body of a further form of knob switch assembly;

FIG. 15 is a partial perspective view of a lever used with the knob switch assembly of FIG. 14;

FIG. 16 is a partial axial sectional view of the knob switch assembly of FIG. 14;

FIG. 17 is an end view of the upper knob body shown in FIG. 14;

FIG. 18 is a development of the upper knob body shown in FIG. 14;

FIG. 19 is a longitudinal sectional side view of a lever switch structure;

In the drawings and the following descriptions, like portions or parts are denoted by like numeral or characters.

Figure 3:
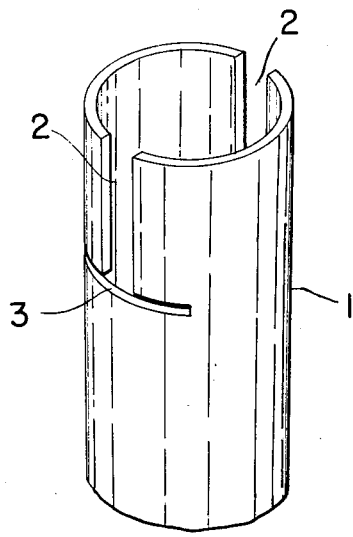
FIG. 3 is a partial perspective view of a lever of the know switch assembly shown in FIG. 1.
Figure 5:
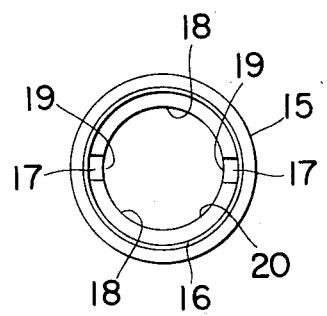
FIG. 5 is an end view of the upper knob body shown in FIG. 4.
Figure 4:
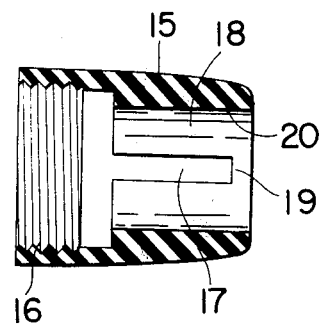
FIG. 4 is a sectional view of an upper knob body of the knob switch assembly shown in FIG. 1.
Figure 7:
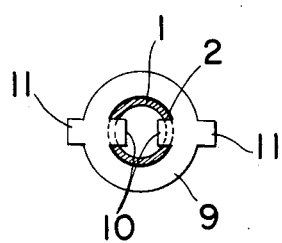
FIG. 7 is a plan view of a rotation stopper member of the knob switch assembly in FIG. 2.
Figure 6:
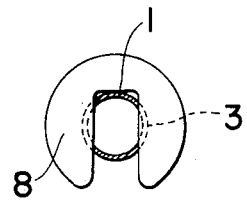
FIG. 6 is a plan view of a stopper member of the knob switch assembly shown in FIG. 2.
Figure 8:
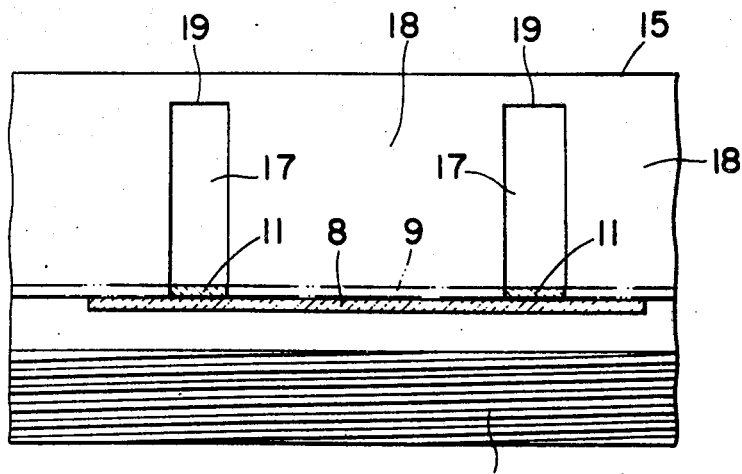
FIG. 8 is a development of the upper knob body.
Figure 9:
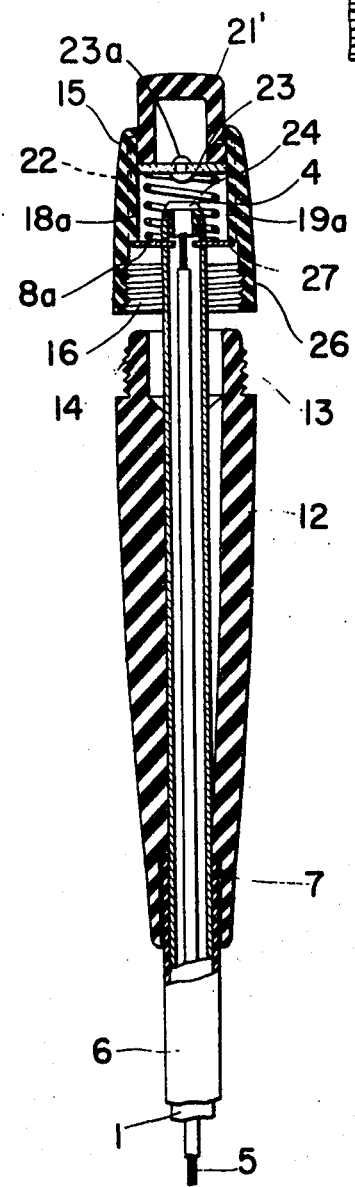
FIG. 9 is an axial sectional view of another form of a knob switch assembly according to the present invention.

Referring now to FIGS. 1 to 8, there is illustrated one form of the knob switch assembly according to the present invention. A lever 1 of conductive material has at one end portion thereof a pair of longitudinal slits 2 and a pair of radial grooves 3 at the lower ends of the pair of longitudinal slits 2. At the tip end of the lever 1, there is provided a fixed contact 4 insulated by an insulating material 4A and connected with an insulated lead wire 5 which runs through a hollow portion of the lever 1. At the internal lower end portion of a lower knob body 12 which is fitted around the end portion of the lever 1, there is provided a shoulder portion 7 which engages with a tip end portion of an insulating tube 6 surrounding the lever to prevent longitudinal movement of the lower knob body 12 relative to the lever. However, the lower knob body 12 can be moved lengthwise of the lever 1 away from the end of tube 6 and can also be rotated relative to the lever for connecting and disconnecting same to the upper knob body 15. Numeral 8 indicates a stopper element of "U" shape inserted from the side of the lever 1 to engage with the grooves 3 of the lever 1. Numeral 9 indicates a rotation stopper member of conductive material having on its internal periphery a pair of projections 10 to engage with the slits 2 and provided on its external periphery with a pair of projections 11 that engage with a pair of grooves 17 provided on an inner face of an upper knob body 15. The upper knob body 15 is fitted around the end portion of the lever 1 so as to engage with the lower knob body and to prevent the rotation of the upper knob body relative to the lever 1. The rotation stopper member 9 is mounted on the lever 1 prior to the mounting of the fixed contact 4. The cylindrical lower knob body 12 is mounted slidably and rotatably on the lever 1 prior to the mounting of the stopper member 8 and the rotation stopper member 9 and is provided at its top portion with a radially reduced portion having a male screw thread 14. An end surface of the radially reduced portion is made so that the end surface corresponds to the undersurface of the stopper member 8. The upper knob body 15 is arranged so that the lower end portion of its external periphery corresponds to the external periphery of te lower knob body 12. Further, on the internal periphery of the upper knob body, there is provided a female screw thread 16 adapted to be screwed to the male screw thread 14 of the lower knob body. On the upper inner face of the upper knob body, there is provided a pair of axial grooves 17 to receive the projections 11 of the rotation stopper member 9 and an inwardly projecting portion 18. In addition, there is provided above the top portion of the grooves 17 an inwardly projecting annular portion 19 to form an aperture 20 through which a push button 21 projects outwardly. The push button 21 has on the external periphery of its lower end portion a pair of engage portions 22 to engage with the groove 17. The push button 21 further includes at its lower end portion a terminal plate 23 which is provided with a contact 23a corresponding to the fixed contact 4 which is provided at the tip end of the lever 1. Numeral 24 indicates a compression spring of a conductive material provided between the terminal plate 23 and the stopper member 9. At a predetermined angular position of the external periphery on the upper knob body, there is provided a mark 25 to indicate the type of load circuit which is controlled by a switch consisting of the fixed contact 4 and the terminal plate 23.

In another form of the knob switch assembly according to the invention as shown in FIGS. 14 through 18, the stopper member 8 is replaced by a pair of stopper members 8'' which are formed integrally with the lever 1 by bending a pair of portions of the lever outwardly as shown in FIG. 15. In this case, however, the stop members 8'' should be formed after said lower knob body 12 is mounted to the lever 1. The stopper members 8'' project into the recesses 19b of the upper knob body. The slots 19a guide the engage portions 22 of the push button 21.

Referring to a further form of the knob switch assembly according to the invention which is shown in FIGS. 9 to 13, inclusive, a "U" shape stopper member 8' engages with the radial grooves 3 provided on the external periphery of the end of the lever 1. The stopper member 8' is provided on its external periphery with a pair of engage portions 9a having the shapes of arcuate recesses and adapted to prevent the separation of the lower knob body 12 from the lever 1. The upper knob body 15 is provided on its internal periphery with a pair of projected portions 19c having lower end surfaces 19d to engage with the engage portions 9a and a protruded portion 18a to face to the opened portion of the "U" shape stopper member 8'. There is provided a female screw thread 16 on the internal periphery of an extended portion 26 of the upper knob body and adapted to be screwed on the male screw thread 14 of the lower knob body. A push button 21' is fitted into the upper knob body and protrudes from an aperture 20 which is provided at the end portion of the upper knob body. Further, the push button 21 is provided on its end portion of the external periphery with a pair of engage portions 22 to engage with the grooves formed between the projection 19c and 18a.

The engage portions 22 are formed so that shoulders of the engage portions 22 engage the flange portions 28 between the projected portions 18a and 19c, which flange portions define the lower end of the aperture 20. A terminal plate 23 having a movable contact member 23a is mounted on the internal periphery of the engage means 22. A compression spring 24 of conductive material is provided between the stopper member 8' and the movable contact member 23. An ornamental design 25 or a letter is provided to indicate the switching direction.

Figure 20:
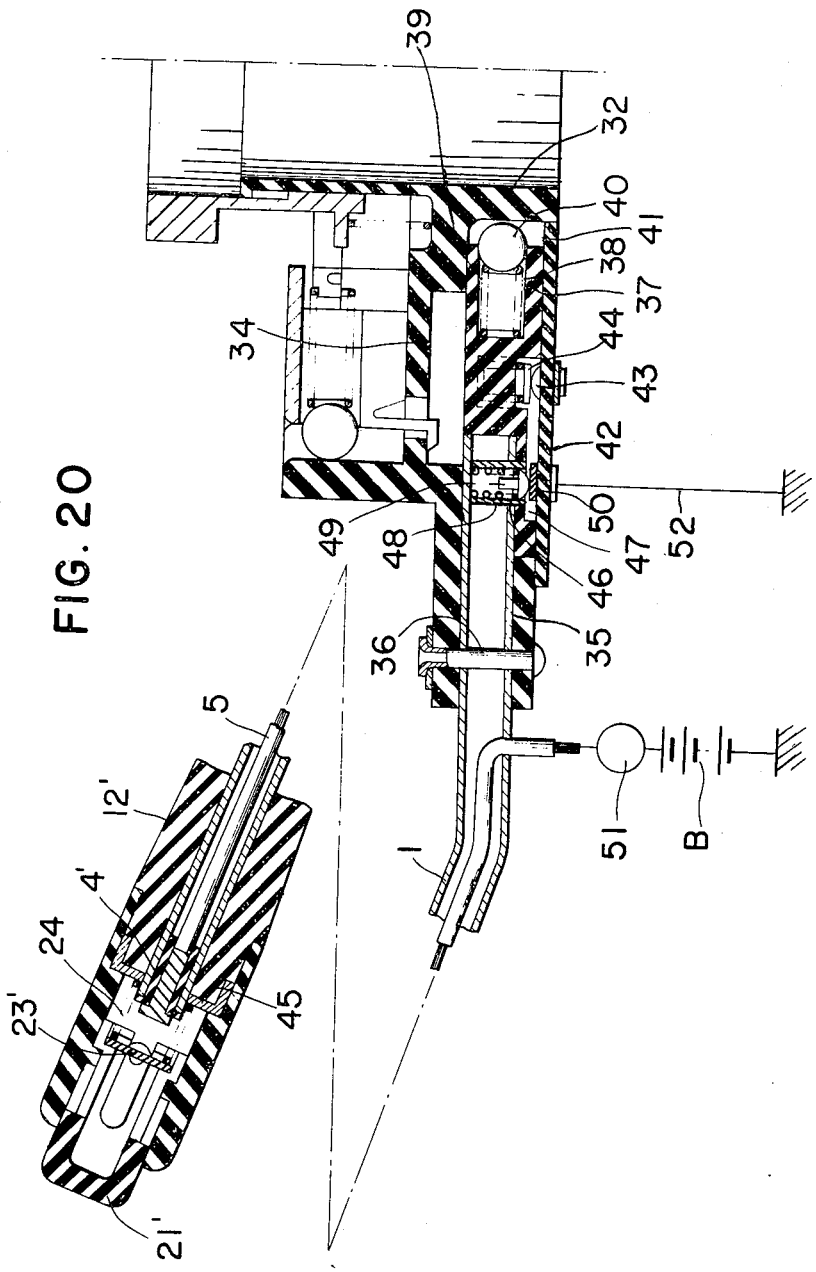
FIG. 20 is a partial enlarged view of the lever switch structure.
Figure 21:
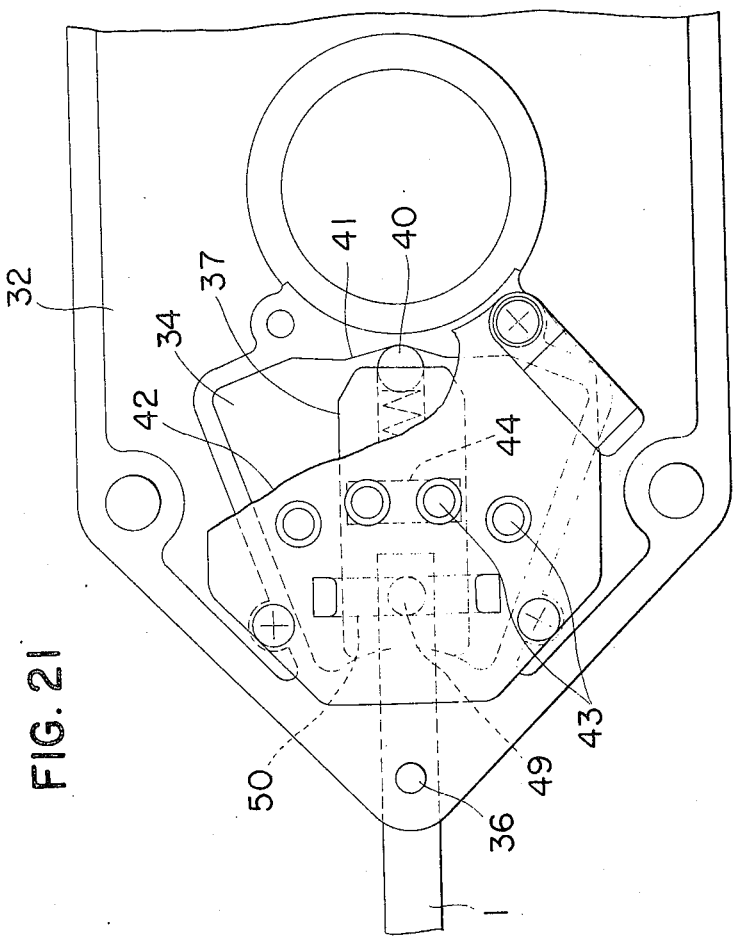
FIG. 21 is a bottom plan view of a lever switch circuit.

In FIGS. 19 to 21 there is shown a lever switch structure comprising a knob switch assembly formed at one end of the lever as mentioned above and a switch assembly of a direction indicator formed at the other end thereof. A direction indicator 31 comprising a body 32 and a movable bracket 33 controls by rotation the action of the indicator switch. There is provided on the lower side of the body 32 a downwardly opened hollow section 34 for the switch apparatus. The other end of the lever 1 of conductive material is inserted into an opening 35 provided on the side of the hollow section 34 whereby the lever end extends into the hollow section 34 and is supported swingably by a pin 36. A contact holder 37 is provided at the other end of the lever 1 to swingably rotate in the hollow section 34. In a recessed portion 38 provided at the end of the contact holder 37 there is provided an engage ball 40 urged by a compression spring 39 into the recessed portion 38 to elastically engage with an engage portion 41 provided on the wall of the hollow section 34. There are provided another plurality of fixed contacts 43 on an insulator 42 mounted in a position to cover the hollow section 34. Another movable contact 44 is mounted to the contact holder 37 and is displaced by the action of the lever 1 from an off position to two positions such as a first speed contact with a fixed contact for a power source or a second speed contact with the fixed contact for a power source.

To the lever switch structure described hereinbefore there is provided at one end of the lever 1 a knob switch assembly as described before which includes, in FIGS. 19 to 21, an externally operable switch comprising a fixed contact 4' mounted at one end portion of the lever 1, a stopper member 45 fixedly mounted to the external periphery of the lever 1, a movable contact 23' mounted on the internal periphery of the engage means provided at lower external periphery of a push button 21' which is supported by a knob body, a compression spring 24 mounted between the stopper member 45 and the movable contact 23'.

From the description given hereinbefore, it is appreciated that the present invention provides a simple and durable lever switch structure in which the knob body assembly is mounted at one end portion of the lever 1 and is arranged so that, in assembling, the mark provided on the external periphery of the upper knob body to indicate the direction of operation or the type of load of the circuit is disposed in a desirable angular position by the provision of the stopper member 8 and the rotation stopper member 9 as well as the longitudinal slits and radially formed grooves without any adjusting step. Further, in the lever switch structure, there is provided another switch assembly for the direction indicator which is operated by the swingable operation of the lever 1. It is appreciated that the lever is of conductive material. Therefore, in the present invention, the lever 1 further serves as a conductor to simplify the wiring passing through the hollow portion of the lever 1. Therefore, the structure of the knob switch assembly provided at the end portion of the lever 1 is simplified.

What is claimmed is:

1. A lever switch structure for use in a motor vehicle, comprising:

an elongated, hollow, conductive lever having at one end thereof a knob switch assembly and having at the other end thereof a direction indicator switch assembly;

the knob switch assembly comprising a lower knob body of insulating material sleeved on the lever for rotation and for longitudinal movement with respect thereto, an upper knob body of insulating material, said upper knob body being screw threadedly attached to the lower knob body, a push button of insulating material, said push button being reciprocably mounted on the upper knob body and projecting outwardly through an opening in the upper knob body, a first contact disposed within the upper knob body and connected in conductive relationship to the lever, a second contact opposed to the first contact and insulation means connecting the second contact to said one end of the lever so that the second contact is mounted on said one end of the lever and is electrically insulated from the lever, the first contact being mechanically coupled to the push button for movement into and out of contact with the second contact in response to movement of the push button;

the upper knob body having indicia on the external surface thereof for indicating the type of load circuit controlled by the lever switch, the push button projecting from the outer end of the upper knob body and being movable in a direction lengthwise of the lever, the first contact being fixedly connected to the push button for movement therewith, the push button having one or more engaging portions slidably disposed in one or more grooves in the upper knob body for guiding movement of the push button lengthwise of the lever and for preventing rotation of the push button relative to the upper knob body;

an insulated conductor connected to the second contact and extending lengthwise within the lever and being electrically insulated therefrom;

rotation stopper means mounted on the lever adjacent said one end thereof and disposed within the upper knob body, the rotation stopper means being clamped between the upper knob body and the lower knob body so that the upper end of the lower knob body abuts against the lower surface of the rotation stopper means, the rotation stopper means including a conductive plate-form stopper member connected to the lever, and the rotation stopper means comprising at least one tab extending transversely to the lever and being received in one or more grooves in the upper knob body;

spring means urging the push button to its outer position wherein the first and second contacts are out of contact with each other, said spring means being a conductive coil spring disposed between the first contact and the rotation stopper means; and internal groove means provided on the upper knob body and engaging the rotation stopper means and fixing the upper knob body against rotation relative to the lever.

2. A lever switch as claimed in claim 1 in which the rotation stopper means includes a plate-form stopper element having an open-end slot whose edges are received in grooves in the lever, the stopper element projecting radially outwardly from the lever with its outer edge portion underlying and bearing against an internal shoulder on the upper knob body below the lower ends of a pair of grooves in the upper knob body, and the plate-form stopper member of conductive material being disposed on top of the stopper element, the stopper member having a pair of inner projections projecting inwardly into longitudinal slits in the lever, and said tab comprising a pair of outer projections on said stopper member projecting into the grooves in the upper knob body.

3. A lever switch as claimed in claim 1 in which said tab comprises a pair of integral tabs bent outwardly from said lever and extending into enlarged recesses at the lower ends of a pair of grooves in the upper knob body, the recesses having side edges and upper edge portions engaging corresponding edge portions of the tabs.

4. A lever switch structure for use in a motor vehicle, comprising:

an elongated, hollow, conductive lever having at one end thereof a knob switch assembly and having at the other end thereof a direction indicator switch assembly;

the knob switch assembly comprising a lower knob body of insulating material sleeved on the lever for rotation and for longitudinal movement with respect thereto, an upper knob body of insulating material, said upper knob body being screw threadedly attached to the lower knob body, a push button of insulating material, said push button being reciprocably mounted on the upper knob body and projecting outwardly through an opening in the upper knob body, a first contact disposed within the upper knob body and connected in conductive relationship to the lever, a second contact opposed to the first contact and insulation means connecting the second contact to said one end of the lever so that the second contact is mounted on said one end of the lever and is electrically insulated from the lever, the first contact being mechanically coupled to the push button for movement into and out of contact with the second contact in response to movement of the push button;

the upper knob body having indicia on the external surface thereof for indicating the type of load circuit controlled by the lever switch, the push button projecting from the outer end of the upper knob body and being movable in a direction lengthwise of the lever, the first contact being fixedly connected to the push button for movement therewith, the push button having one or more engaging portions slidably disposed in one or more grooves in the upper knob body for guiding movement of the push button lengthwise of the lever and for preventing rotation of the push button relative to the upper knob body;

an insulated conductor connected to the second contact and extending lengthwise within the lever and being electrically insulated therefrom;

rotation stopper means mounted on the lever adjacent said one end thereof and disposed within the upper knob body, the rotation stopper means being clamped between the upper knob body and the lower knob body so that the upper end of the lower knob body abuts against the lower surface of the rotation stopper means, the rotation stopper means comprising a plate-form stopper element having an open-end slot whose edges are received in grooves in the lever, the stopper element having a pair of recesses in diametrically opposite sides of its outer edge, the upper knob body having inwardly projecting wall portions extending into the recesses to prevent relative rotation between the stopper element and the upper knob body;

spring means urging the push button to its outer position wherein the first and second contacts are out of contact with each other, said spring means being a conductive coil spring disposed between the first contact and the rotation stopper means; and internal groove means provided on the upper knob body and engaging the rotation stopper means and fixing the upper knob body against rotation relative to the lever.

* * * * *